United States Patent Office 2,798,355
Patented July 9, 1957

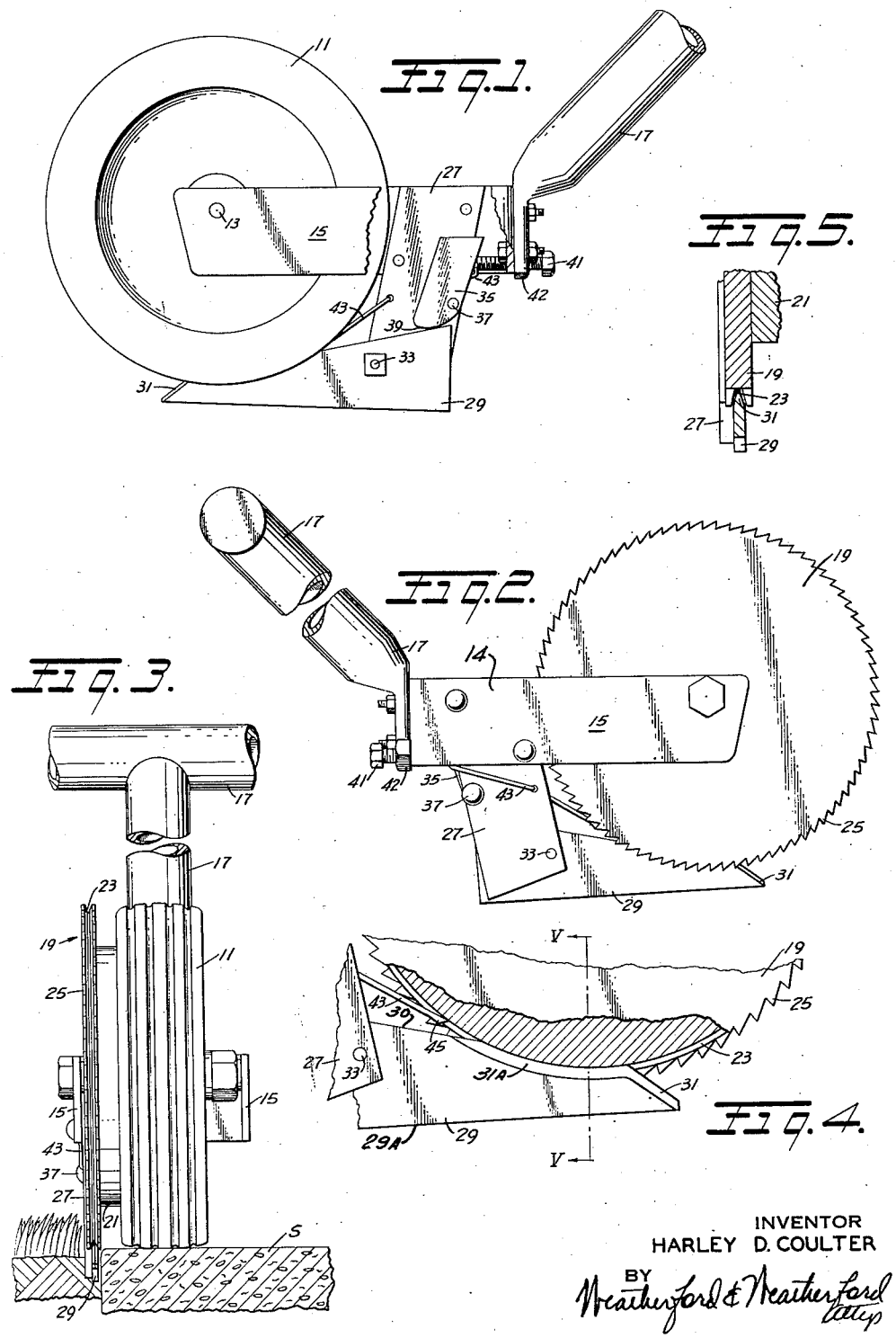

2,798,355

ROTARY LAWN EDGER

Harley D. Coulter, Memphis, Tenn.

Application July 23, 1954, Serial No. 445,413

2 Claims. (Cl. 56—256)

This invention relates to certain new and useful improvements in devices for trimming the edges of lawns, particularly as at sidewalks and other bordering areas.

It particularly relates to a device which consists of an easily handled wheel-supported device having a double toothed disc-like member and a cutting blade riding between the double teeth of the disc member, the teeth being adapted to engage the grass overhanging from the edges of lawns which are to be trimmed and to move same across the cutting edge of the blade.

The principal object of the present invention is to provide a new and novel device for edging lawns and the like.

A further object of the invention is to provide such a device which includes a disc member having a double set of peripheral tooth-like fingers, the respective sets of fingers being transversely spaced apart and separated by a groove and having a lower cutting blade, the cutting edge of the blade being positioned in the said groove.

A further object of the invention is to provide a new and novel means for adjusting the position of the cutting blade relative to the disc-like member.

A further object of the invention is to provide in such a cutting device a new and novel means for maintaining the groove between the peripheral teeth in clean condition; and A further object of the invention is to generally improve the design, construction and efficiency of devices for edging lawns and the like.

The means by which the foregoing and other objects of the present invention are accomplished and the manner of their accomplishment will readily be understood from the following specification upon reference to the accompanying drawings, in which:

Fig. 1 is a fragmentary side elevational view of the lawn edger, with parts broken away and shown in section.

Fig. 2 is a fragmentary side elevational view taken from the opposite side of the device.

Fig. 3 is a fragmentary front elevational view of the device in use position.

Fig. 4 is a fragmentary side view on an enlarged scale of a lower portion, with parts broken away and shown in section for purposes of illustration to show the relationship of the parts of the device, the view being seen from the side shown in Fig. 2; and Fig. 5 is a sectional view taken as on the line V—V of Fig. 4.

Referring now to the drawings in which the various parts are indicated by numerals, the device of the present invention is supported for movement from place to place by a wheel 11 mounted upon and fixed to a suitable shaft 13, the opposite ends of shaft 13 being journalled for rotation in the forwardly projecting legs 14 of a substantially U-shaped frame 15. To the rear of frame 15 an upwardly projecting handle 17 is attached. Mounted on shaft 13 for rotation therewith and with wheel 11 is a disc-like grass-engaging member 19 which is preferably laterally spaced from wheel 11 as by a suitable spacer 21. The periphery of disc-like member 19 is inwardly channelled to provide a peripheral groove 23 which is preferably V-shaped in cross section. The disc is further provided with two parallel sets of projecting grass-engaging teeth or fingers 25 which project beyond groove 23, the respective sets of teeth closely embracing the opposite sides of groove 23.

Rigidly fixed to and projecting downwardly from frame 15 is a bracket 27, to the lower end of which is removably attached a substantially triangular blade 29. The lower edge 29A of blade 29 is substantially horizontal and the upper edge 30 is inclined rearwardly. The forward portion of the upper edge of blade 29 is preferably sharpened as at 31 and blade 29 is positioned with sharpened edge portion 31 projecting into peripheral groove 23 and lying between the peripheral sets of teeth 25. The teeth substantially slidably contact the sides of blade 29 and edge portion 31 substantially engages the valley of groove 23. It will be observed that sharpened edge 31 is provided with a slightly concaved contour 31A enabling the blade to closely conform to the arc of the portion of the peripheral groove within which it is positioned. Preferably blade 29 is detachably connected to bracket 27 as by a suitable bolt 33, bracket 27 being preferably provided with a suitable threaded opening for receiving bolt 33 so as to rigidly fix blade 29 in desired position. Blade 29 is prevented from shifting away from its engagement with disc 19 about bolt 33 by an abutment adjustment member 35. Adjustment member 35 is pivotally connected to bracket 27 adjacent and above blade 29 as by a pivot pin 37, the pivotal connection being adjacent the rear edge of adjustment member 35 and off center from the vertical center line of adjustment member 35. The lower face of member 35 is a curved cam-like face disposed eccentrically of pivot pin 37 and bears against the upper edge of the triangular blade 29.

Threadedly engaged with the rear of frame 15 is a take-up thrust screw 41, the end of screw 41 projecting beyond frame 15 and into engagement with the rear edge of adjustment member 35. Screw 41 may be provided with a suitable lock nut 42. As can readily be seen, upon advancement of screw 41 inwardly toward wheel 11 engagement of the end of the screw against the rear edge of adjustment member 35 causes the adjustment member to move about the pivot 37 causing the cam-like face 39 of the member to effect a downward pressure upon the upper edge of blade 29, causing the same to pivot about bolt 33 and thus to move the sharpened edge 31 of the blade upwardly into peripheral groove 23. This adjustment arrangement is particularly advantageous in enabling the rapid adjustment of blade 29, as for example when the same has become worn through use, and in addition the adjustment member 35 serves as an abutment engaging against the upper edge of blade 29 so as to prevent the blade after positioning as desired from dropping away from that position in undesired manner.

Additionally fixed to bracket 27 is a resilient spring finger 43 having a forwardly projecting end 45 which rides in peripheral groove 23 adjacent but above blade 29 and slightly rearward of sharpened edge 31, end 45 being broadened.

It will be observed that the teeth of the peripheral sets are all angularly disposed relative to the periphery of disc 19 with the angles respectively being inclined in the direction of forward rotation of the device in the use thereof.

In the use of the device it is assembled in the manner described hereinabove and blade 29 is adjusted on bracket 27 through the use of adjustment member 35 and thrust screw 41 until the sharpened edge 31 of the blade is moved into the peripheral groove 23 and a section of the sharpened edge portion 31 is embraced between segments of the peripheral sets of teeth 25. Spring finger 43 is positioned with the forward end of the finger 45 riding in groove 23 rearwardly of blade edge 31.

With the device thus assembled and set as desired it may be moved as to the edge of a sidewalk S with wheel 11 positioned upon the sidewalk S and with disc 19 projecting below the surface of the sidewalk.

It will be seen that the blade 29 projects below the periphery of wheel 11 and of disc 19. With the device thus positioned forward motion thereof may be begun by pushing upon handle 17 and the angularly disposed peripheral teeth 25 moving in a rotational path responsive to rotation of disc 19 upon forward motion of wheel 11 are effective to engage wisps and strands of grass projecting from the adjacent lawn and to move the wisps and strands of grass across blade edge 31, effecting severing thereof in desired manner.

As is apparent, fragments of such severed grass and of other trash are likely to be retained in peripheral groove 23 as the same moves past and beyond blade edge 31. The purpose of spring finger 43 is to substantially prevent the accumulation of trash or other accumulations in the peripheral groove, the end 45 of finger 43 riding in the groove being effective to scrape therefrom any such accumulations.

It will be understood that while there has been described a preferred embodiment of the present invention, that variations may be made therein without departing from the invention.

I claim:

1. In a lawn edger which includes a frame, a wheel rotatably supported by said frame, a disc-like member connected to said wheel for rotation therewith, said disc member having a peripheral groove, a pair of sets of laterally spaced peripheral teeth carried by said disc member embracing said groove, a blade adjustably supported from said frame and having an upper inclined edge including a forward sharpened portion, said edge being positioned to project said sharpened portion into said groove between said sets of teeth, an abutment member, pivot means connecting said abutment member to said frame rearward of said disc member, thrust screw means engaging the rear of said abutment member, the lower end of said abutment member having a curved cam face extending eccentrically of said pivot means, said cam face bearing against the rear portion of said blade edge rearward of said sharpened portion to retain said edge projecting into said groove, adjustment of said thrust screw means shifting said abutment member and said cam face to cam said blade toward said disc-like member, and a spring finger carried by said frame projecting into said groove rearwardly of and above said blade edge sharpened portion, the teeth of said sets on wheel and disc rotation being successively moved past said blade edge sharpened portion to move grass and the like across said sharpened portion for severing, said finger cleaning said groove of residue of severed grass.

2. In a lawn edger which includes a frame, a wheel rotatably supported by said frame, a disc-like member connected to said wheel for rotation therewith, said disc member having a peripheral groove, a pair of sets of laterally spaced peripheral teeth carried by said disc member embracing said groove, a blade adjustably supported from said frame and having an upper inclined edge including a forward sharpened portion, said edge being positioned to project said sharpened portion into said groove between said sets of teeth, an abutment member, pivot means connecting said abutment member to said frame rearward of said disc member, thrust means engaging the rear of said abutment member, the lower end of said abutment member having a curved cam face extending eccentrically of said pivot means, said cam face bearing against the rear portion of said blade edge rearward of said sharpened portion to retain said sharpened portion projecting into said groove, adjustment of said thrust means shifting said abutment member and said cam face to cam said blade toward said disc-like member, the teeth of said sets on wheel and disc rotation being successively moved past said blade edge to move grass and the like across said edge for severing.

References Cited in the file of this patent

UNITED STATES PATENTS

| | | |
|---|---|---|
| 1,861,104 | Wolf | Mar. 31, 1932 |
| 2,484,276 | Eberhart | Oct. 11, 1949 |
| 2,494,223 | Abrens | Jan. 10, 1950 |
| 2,746,229 | Orr | May 22, 1956 |